(12) United States Patent
Verbrugge et al.

(10) Patent No.: US 12,208,372 B2
(45) Date of Patent: Jan. 28, 2025

(54) SOLID PHASE CONDITIONING

(71) Applicant: GE HEALTHCARE LIMITED, Buckinghamshire (GB)

(72) Inventors: Nicolas Verbrugge, Loncin (BE); Xavier Y. A. Franci, Loncin (BE); Natthawadee Thawinwisan, Loncin (BE)

(73) Assignee: GE HEALTHCARE LIMITED, Buckinghamshire (GB)

( * ) Notice: Subject to any disclaimer, the term of this patent is extended or adjusted under 35 U.S.C. 154(b) by 831 days.

(21) Appl. No.: 16/472,747

(22) PCT Filed: Dec. 21, 2017

(86) PCT No.: PCT/EP2017/084222
§ 371 (c)(1),
(2) Date: Jun. 21, 2019

(87) PCT Pub. No.: WO2018/115353
PCT Pub. Date: Jun. 28, 2018

(65) Prior Publication Data
US 2020/0047158 A1 Feb. 13, 2020

(30) Foreign Application Priority Data
Dec. 21, 2016 (GB) ..................... 1621864

(51) Int. Cl.
*B01J 20/287* (2006.01)
*B01D 15/20* (2006.01)
*B01D 15/32* (2006.01)
*C07B 59/00* (2006.01)

(52) U.S. Cl.
CPC .......... *B01J 20/287* (2013.01); *B01D 15/203* (2013.01); *B01D 15/325* (2013.01); *C07B 59/00* (2013.01); *B01J 2220/62* (2013.01); *C07B 2200/05* (2013.01)

(58) Field of Classification Search
CPC ... B01J 20/287; B01J 2220/62; B01D 15/203; B01D 15/325; C07B 59/00; C07B 2200/05

USPC ......................................................... 502/401
See application file for complete search history.

(56) References Cited

U.S. PATENT DOCUMENTS

| | | | |
|---|---|---|---|
| 8,053,622 B2 | 11/2011 | Osborn et al. | |
| 9,359,288 B2 | 6/2016 | Svadberg et al. | |
| 10,869,942 B2 * | 12/2020 | Olberg ................ | A61K 51/088 |
| 2015/0139902 A1 | 5/2015 | Engell et al. | |
| 2015/0259307 A1 | 9/2015 | Horn et al. | |
| 2017/0217896 A1 | 8/2017 | Xu et al. | |
| 2017/0313632 A1 | 11/2017 | Franci et al. | |

FOREIGN PATENT DOCUMENTS

| | | | |
|---|---|---|---|
| CN | 101146611 A | 3/2008 | |
| CN | 104302658 A | 1/2015 | |
| CN | 104507905 A | 4/2015 | |
| CN | 106715397 A | 5/2017 | |
| CN | 107108393 A | 8/2017 | |
| WO | WO-2014154886 A1 * | 10/2014 | ............ A61K 51/00 |
| WO | 2016019285 A1 | 2/2016 | |

OTHER PUBLICATIONS

Lemaire et al. J. Label Compd Radiopharm. 2002, 45, 435-447. (Year: 2002).*
Office Action received in Chinese Application No. 201780086960.6 dated Jan. 7, 2022, with translation, 17 pages.
Search Report received in Chinese Application No. 201780086960.6 dated Dec. 29, 2021, with translation, 3 pages.

* cited by examiner

*Primary Examiner* — Michael G. Hartley
*Assistant Examiner* — Sean R Donohue
(74) *Attorney, Agent, or Firm* — MCANDREWS HELD & MALLOY, LTD

(57) ABSTRACT

The present invention relates to a method for conditioning reversed phase SPE cartridges that provides certain advantages compared with known such methods. The method of the invention finds particular use in the automated synthesis of radiolabeled compounds where SPE is used for example in the purification steps.

5 Claims, 1 Drawing Sheet

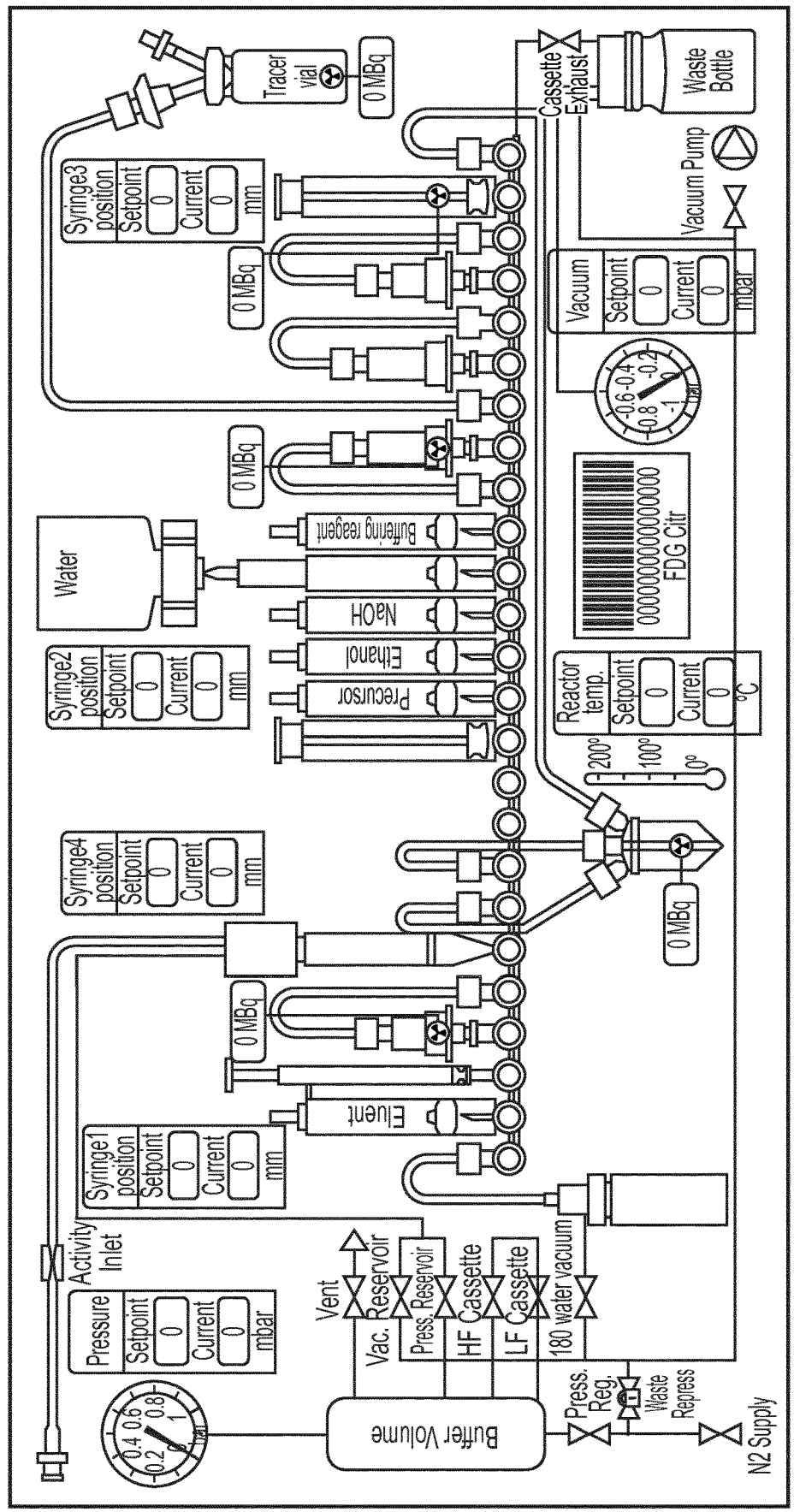

SOLID PHASE CONDITIONING

CROSS-REFERENCE TO RELATED APPLICATIONS

This application is a filing under 35 U.S.C. 371 of international application number PCT/EP2017/084222, filed Dec. 21, 2017, which claims priority to application number 1621864.6 filed in Great Britain on Dec. 21, 2016, the entire disclosures of each of which are hereby incorporated by reference.

TECHNICAL FIELD OF THE INVENTION

The present invention relates to the field of solid phase extraction (SPE) and in particular to SPE cartridges. A method of conditioning an SPE cartridge is provided by the present invention that provides certain advantages compared with known such methods. The method of the invention finds use for example in the automated synthesis of radiolabeled compounds.

DESCRIPTION OF RELATED ART

Conditioning of reverse-phase SPE sorbent with an organic solvent, such as methanol (MeOH), acetonitrile (MeCN), isopropanol (i-PrOH) or tetrahydrofuran (THF), followed by equilibration with water or a buffer, is necessary in order to reproducibly obtain the desired product or products. If conditioning is not carried out, aqueous solvent will not penetrate the hydrophobic surface and wet the sorbent and only a small proportion of the surface is available to interact with the analyte.

Radiolabelled compounds for use in medical diagnostic applications can be synthesized by means of automated radiosynthesisers. These commercially-available compact automated systems are able to perform various chemical synthesis steps to convert externally produced radioisotopes into radiolabelled compounds. Such technology is commonly used in the production of a number of radiopharmaceuticals and in particular positron emission tomography (PET) tracers. As the synthesis of radiolabeled compounds involves a radioactive isotope, the radiosynthesiser must be operated within a shielded hot-cell.

The FASTlab is an example of a commercially-available radiosynthesiser known for its use in the automated production of a range of radiopharmaceuticals, in particular PET tracers. It operates by use of single-use consumables (commonly called "cassettes") that are mounted on the radiosynthesiser at the start of a radiosynthesis and discarded at the end. Production is conducted on the radiosynthesiser via a sequence of steps, which are specific for each particular radiopharmaceutical. Use of this methodology is advantageous as it offers repeatability of yields and safety for the operator who is in contact with as low level of chemicals and radioactivity as possible.

Typically, an automated process for the production of a radiopharmaceutical involves use of one or more SPE cartridges that form part of the cassette. Each SPE cartridge is used for a particular purpose, e.g. for trapping $^{18}F$-fluoride, to carry out solid phase deprotection or for purification. A known process for the automated production of the PET tracer $^{18}F$-fluorodeoxyglucose ([$^{18}F$]-FDG) includes use of a tC18 reversed phase SPE cartridge for removal of protecting groups from the intermediate $^{18}F$-tetraacetylfluoroglucose ([$^{18}F$]-FTAG; below on the left of the hydrolysis reaction), obtained following reaction of the precursor compound mannose triflate with [$^{18}F$]-fluoride.

Once trapped on the cartridge, the [$^{18}F$]-FTAG is hydrolysed with NaOH into the more polar [$^{18}F$]-FDG (on the right of the hydrolysis reaction below), which is no longer retained on the SPE cartridge.

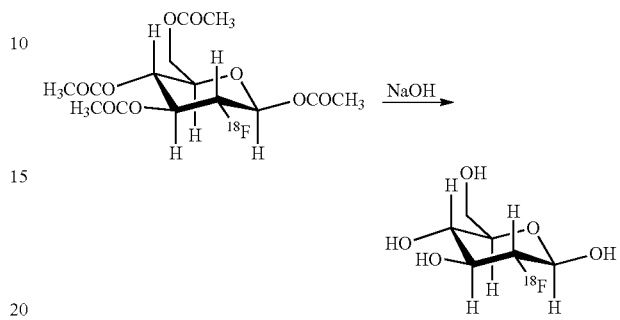

To maximize the yield of this deprotection it is desirable for the SPE cartridge to have as high trapping efficiency for [$^{18}F$]-FTAG as possible. However, the present inventors have observed between-batch variability of the trapping efficiency of these SPE cartridges. Indeed, some batches were observed to have a significantly lower trapping efficiency for [$^{18}F$]-FTAG. This observation was made in particular when where ambient temperatures were higher, e.g. in the range 25-35° C. and in particular 28-35° C.

There is therefore a need for ways to overcome this variability.

SUMMARY OF THE INVENTION

In one aspect the present invention relates to a method to condition a reversed phase SPE cartridge wherein said method comprises the steps of passing:
  (i) an inorganic solvent wherein said inorganic solvent is acidic or alkaline;
  (ii) a polar organic solvent;
  (iii) a low-strength solvent; and,
through said SPE cartridge.

In another aspect the present invention provides a conditioned reversed phase SPE cartridge obtainable by the method as defined herein.

In a further aspect the present invention relates to use of the conditioned reversed phase SPE cartridge as defined herein, or as obtained by the method as defined herein, in the manufacture of a radiopharmaceutical.

In a yet further aspect the present invention provides a method for the production of a radiolabelled compound comprising:
  (a) reacting a precursor compound with a suitable radioisotope to obtain a reaction mixture;
  (b) processing said reaction mixture on one or more conditioned reversed phase SPE cartridges, wherein each of said conditioned reversed phase SPE cartridges is as defined herein, or as obtained by the method as defined herein.

Another aspect of the present invention is a method to deprotect a protected radiolabelled intermediate wherein said method comprises trapping said protected radiolabelled intermediate onto a conditioned reversed phase SPE cartridge as defined herein, or as obtained by the method as defined herein, and then passing a deprotecting reagent through said SPE cartridge to obtain a deprotected radiolabelled compound.

Another aspect of the present invention is a method to purify a reaction mixture comprising a radiolabelled compound wherein said method comprises passing said reaction mixture through a conditioned reversed phase SPE cartridge as defined herein, or as obtained by the method as defined herein.

The various aspects of the present invention make use of a hitherto unknown conditioning method. The present inventors have demonstrated that the method provides consistently good trapping efficiency of [$^{18}$F]-FTAG in the automated synthesis of [$^{18}$F]-FDG, thereby reducing the variability between batches as well as improving the consistency and control of the yield even at higher ambient temperatures. The trapping efficiency was observed to be consistently at its maximum level.

BRIEF DESCRIPTION OF THE FIGURES

FIG. 1 is a schematic diagram of the commercially-available FASTlab FDG Citrate cassette.

DETAILED DESCRIPTION OF THE PREFERRED EMBODIMENTS

To more clearly and concisely describe and point out the subject matter of the claimed invention, definitions are provided hereinbelow for specific terms used throughout the present specification and claims. Any exemplification of specific terms herein should be considered as a non-limiting example.

The terms "comprising" or "comprises" have their conventional meaning throughout this application and imply that the agent or composition must have the essential features or components listed, but that others may be present in addition. The term 'comprising' includes as a preferred subset "consisting essentially of" which means that the composition has the components listed without other features or components being present.

The term "condition" in the context of the present invention refers to the process by which the reversed phase SPE cartridge is prepared for use; or, more accurately, the sorbent contained within the reversed phase SPE cartridge. This process is also sometimes referred to as "equilibrating" the sorbent. Typically, the known process to condition a reversed phase SPE cartridge involves addition of an organic solvent, usually methanol, through the sorbent to wet the packing material and solvate the functional groups of the sorbent. This is followed by re-equilibration using a low-strength solvent such as water or an aqueous buffer.

The term "solid phase extraction (SPE)" refers to the sample preparation process by which compounds in a solution are separated from each other based on their respective affinities for a "sorbent" (also known as the "solid phase" or "stationary phase") through which the sample is passed and the solvent (also known as the "mobile phase" or "liquid phase") in which they are dissolved. The result is that a compound of interest is either retained on the sorbent or in the mobile phase. The portion that passes through the sorbent is collected or discarded, depending on whether it contains the compound of interest. If the portion retained on the stationary phase includes the compound of interest, it is removed from the stationary phase for collection in an additional step, in which the stationary phase is rinsed with another solution termed an "eluent". In the present invention SPE is carried out using an "SPE cartridge" (also often referred to as an "SPE cartridge"). These are readily available commercially and typically in the form of a syringe-shaped column packed with sorbent. Most known sorbents are based on silica that has been bonded to a specific functional group, e.g. hydrocarbon chains of variable length (suitable for reverse-phase SPE), quaternary ammonium or amino groups (suitable for anion exchange), and sulfonic acid or carboxyl groups (suitable for cation exchange).

"Reversed-phase SPE" makes use of a nonpolar modified sorbent and a polar mobile phase. Compounds are retained by hydrophobic interactions and eluted using a non-polar elution solvent to disrupt the forces that bind the compound to the sorbent. Non-limiting examples of reversed-phase SPE cartridges include C18, tC18, C8, CN, Diol, HLB, Porapak, RDX, and $NH_2$ SPE cartridges. In one embodiment of the present invention the reversed-phase SPE cartridge is a tC18 or a HLB SPE cartridge.

In one embodiment, said reverse-phase SPE cartridge is a HLB SPE cartridge. In another embodiment of the present invention the reversed-phase SPE cartridge is a tC18 column.

In some embodiments of the present invention the tC18 column is an environmental tC18 column, sometimes referred to as a long tC18 column or a tC18 plus column.

In one embodiment of the invention said SPE cartridge comprises between 250-1000 mg of sorbent. In one embodiment of the invention said SPE comprises between 300-500 mg of sorbent. In one embodiment of the invention said SPE comprises around 400 mg of sorbent. In one embodiment of the invention said SPE comprises between 800-1000 mg sorbent. In one embodiment of the invention said SPE comprises around 900 mg sorbent.

The term "polar" used to describe a solvent refers to a liquid with polar molecules which dissolves polar compounds. Polar solvents have large dipole moments; they contain bonds between atoms with very different electronegativities, such as oxygen and hydrogen.

The term "organic" used in the context of solvents herein takes its ordinary meaning in the field of chemistry. An organic solvent is a solvent whose molecules contain hydrocarbons. In one embodiment of the invention the polar organic solvent is selected from tetrahydriofuran (THF), dichloromethane (DCM), dimethylformamide (DMF), acetonitrile (MeCN), dimethyl sulfoxide (DMSO), acetic acid, t-butanol, n-propanol, ethanol (EtOH) and methanol (MeOH). In one embodiment of the invention said apolar organic solvent is selected from EtOH, MeOH and MeCN.

The term "inorganic used in the context of solvents herein takes its ordinary meaning in the field of chemistry. An inorganic solvent is a solvent whose molecules do not contain hydrocarbons. In one embodiment of the invention said inorganic solvent is acidic. In one embodiment of the invention where said inorganic solvent is acidic said inorganic solvent is selected from HCl, $H_3PO_4$ and $H_2SO_4$. In one embodiment of the invention said inorganic solvent is alkaline. In one embodiment of the invention where said inorganic solvent is alkaline said inorganic solvent is selected from KOH, NaOH, $K_2CO_3$ or a tetraalkylammonium salt. In one embodiment between 0.2-2.0 mL of said inorganic solvent is passed through said SPE cartridge in said conditioning step. In one embodiment 0.5-1.5 mL of said inorganic solvent is passed through said SPE cartridge in said conditioning step. Non-limiting examples of particular volumes of inorganic solvent include 0.7 mL and 0.5 ml.

A "low-strength solvent" in the context of the present invention refers to aqueous solvents including water and buffers. In the context of preparation of radiopharmaceuticals "water" is suitably of a high quality, e.g. water for injection. A "buffer" in the present invention is a solution that resists changes in pH when acid or alkali is added to it. Buffers typically involve a weak acid or alkali together with one of its salts. In one embodiment of the invention said low-strength solvent is selected from water or a buffer. In one embodiment of the invention said low-strength solvent is water. In one embodiment of the invention said low-strength solvent is a buffer. In one embodiment where the low-strength solvent is a buffer, said buffer is selected from a citrate, phosphate or oxalate buffer.

The terms "acidic" and "alkaline" take their ordinary meaning in the art. A solution is said to be acidic, or acid, if its hydrogen ion concentration is greater than its hydroxyl ion concentration. A substance is an acid if, when added to a solution, it brings about an increase in the hydrogen ion concentration of the solution, all other independent variables in the solution remaining constant. A solution is said to be alkaline, or basic, if its hydrogen ion concentration is less than its hydroxyl ion concentration. A substance is a base if, when added to a solution, it brings about a decrease in the hydrogen ion concentration of the solution, all other independent variables in the solution remaining constant.

In one embodiment steps (i)-(iii) of the method of the invention are carried out sequentially.

In one embodiment of the method of the invention said conditioning further comprises the following step (iv) of passing a low-strength solvent as defined herein through the SPE cartridge as defined herein.

A person skilled in the art of using SPE cartridges would have no difficulty carrying out the method of the present invention. Suitable reversed phase SPE cartridges are readily available commercially, as are the various solvents required for each of the steps of the method. The person skilled in the art will be familiar with known techniques to condition a reversed phase SPE cartridge, and these methods are adapted in a facile manner to arrive at the present invention by substituting the known solutions for those defined herein as suitable for the present invention.

In another aspect the present invention provides a conditioned reversed phase SPE cartridge obtainable by the method as defined herein. This conditioned reversed phase SPE cartridge has advantageous properties as compared with reversed phase SPE cartridges conditioned according to methods of the prior art. The present inventors have demonstrated this in the context of production of a radiopharmaceutical.

Therefore in another aspect the present invention provides for use of the conditioned reversed phase SPE cartridge as defined herein in the manufacture of a radiopharmaceutical as defined herein.

The term "radiopharmaceutical" as used herein refers to a radiolabelled compound suitable for medicinal use, either in diagnosis or treatment. Radiopharmaceuticals are typically used in small amounts for diagnostic in vivo imaging tests and in larger doses to deliver radiation for use in radiotherapy. A "SPECT tracer" is a radiopharmaceutical for use in in vivo imaging comprising a compound radiolabelled with a suitable gamma emitting isotope. A "PET tracer" is a radiopharmaceutical for use in in vivo imaging comprising a compound radiolabelled with a suitable positron emitting isotope. In one embodiment use of the conditioned reversed phase SPE cartridge of the invention is in the manufacture of a SPECT tracer or a PET tracer. In one embodiment use of the conditioned reversed phase SPE cartridge of the invention is in the manufacture of a PET tracer. Where the use of the reversed phase SPE cartridge of the invention is in the manufacture of a PET tracer that PET tracer in one embodiment is selected from $^{18}$F-fluorodeoxyglucose ([$^{18}$F]-FDG), [$^{18}$F]-F-DOPA, [$^{18}$F]-fluorouracil, [$^{18}$F]-FACBC, [$^{18}$F]-altanserine, [$^{18}$F]-fluorodopamine, $^{18}$F-[FLT], $^{18}$F-[FMISO], [$^{18}$F]-fluorobenzothiazoles, [$^{18}$F]-fluorocholine and [$^{18}$F]-flutemetamol. In one embodiment said PET tracer is selected from [$^{18}$F]-FDG, [$^{18}$F]-FACBC, $^{18}$F-[FLT] and $^{18}$F-[FMISO]. In one embodiment said PET tracer is [$^{18}$F]-FDG.

In another aspect the present invention is a method for the production of a radiolabelled compound comprising the steps of (a) reacting a precursor compound with a suitable radioisotope to obtain a reaction mixture; and, (b) processing said reaction mixture on one or more conditioned reversed phase SPE cartridges, wherein each of said conditioned reversed phase SPE cartridges is as defined herein.

A "radiolabelled compound" is a compound that comprises at least one radioactive isotope.

A "precursor compound" comprises a non-radioactive derivative of a radiolabelled compound. Suitable precursor compounds are designed so that reaction with a convenient chemical form of a radioactive isotope occurs site-specifically and can be conducted in the minimum number of steps (ideally a single step) to give the desired radiolabelled compound. Precursor compounds are synthetic and are conveniently obtained in good chemical purity. The person skilled in the art of producing radiolabelled compounds will be familiar with precursor compounds suitable for obtaining particular radiolabelled compounds. The reader is directed for example to various chapters in "Handbook of Radiopharmaceuticals: Radiochemistry and Applications" (2003 Wiley; Welch & Redvanly, Eds.) that provide detail about precursor compounds and methods for their conversion into radiolabelled compounds.

The term "radioisotope" (also "radioactive isotope" or "radionuclide") is an atom that has excess nuclear energy, making it unstable. This excess energy is dissipated by spontaneous emission of radiation in the form of alpha, beta, and gamma rays.

A "reaction mixture" is the product of combining two or more chemical substances together causing one or more chemical transformations.

In one embodiment of the method for production of a radiolabelled compound said precursor compound comprises protecting groups, said reaction mixture comprises a protected radiolabelled intermediate and said processing comprises removal of said protecting groups. The term "protecting group" is well-known to those skilled in the art. A protecting group is introduced into a molecule by chemical modification of a functional group in order to obtain chemoselectivity in a subsequent chemical reaction. Production of protected compounds as well as their subsequent deprotection with deprotecting reagents is described in 'Protective Groups in Organic Synthesis', Theorodora W. Greene and Peter G. M. Wuts, (Fourth Edition, John Wiley & Sons, 2007).

In one embodiment, removal of said protecting groups is carried out by passing the reaction mixture through said SPE cartridge to trap said protected radiolabelled intermediate and then passing a deprotecting reagent through said SPE cartridge to obtain said radiolabelled compound. The term "trap" or "trapping" refers to the process wherein a particular compound or compounds binds to the sorbent of an SPE cartridge.

In one embodiment of the method for production of a radiolabelled compound said processing comprises purification of said reaction mixture to obtain said radiolabelled compound in a purified form. The term "purification" as used herein may be taken to mean a process to obtain substantially pure compound (a compound in "purified form"). The term "substantially" refers to the complete or nearly complete extent or degree of an action, characteristic, property, state, structure, item, or result. The term "substantially pure" encompasses (the ideal but in practice difficult to obtain) completely pure compound as well as compound that is sufficiently pure to be suitable for a particular use, e.g. as a radiopharmaceutical.

In one embodiment of the method for production of a radiolabelled compound said radiolabelled compound is a single-photon emission tomography SPECT tracer or a PET tracer as defined herein. In one embodiment of the method for production of a radiolabelled compound said radiolabelled compound is a PET tracer as defined herein. Where the radiolabelled compound is the PET tracer [$^{18}$F]-FDG said precursor compound is mannose triflate and said protected radiolabelled intermediate is $^{18}$F-tetraacetylfluoroglucose ([$^{18}$F]-FTAG).

Where the radiolabelled compound in the present invention is an in vivo imaging agent such as a PET tracer or a SPECT tracer "suitable for use" can be taken to mean that the substantially pure compound is suitable for intravenous administration to a mammalian subject followed by in vivo imaging to obtain one or more clinically-useful images of the location and/or distribution of the radiolabelled compound.

In one embodiment said method for production of a radiolabelled compound said radiolabelled compound is automated. "Automated" takes its ordinary meaning in the art, which is to say carried out by a machine rather than manually by a person.

In one embodiment said method for the production of a radiolabelled compound is carried out on an automated synthesis apparatus. In one embodiment said automates synthesis apparatus is a FASTlab. By the term "automated synthesis apparatus" is meant an automated module based on the principle of unit operations as described by Satyamurthy et al (1999 Clin Positr Imag; 2(5): 233-253). The term "unit operations" means that complex processes are reduced to a series of simple operations or reactions, which can be applied to a range of materials. Such automated synthesis apparatuses are commercially available from a range of suppliers (Satyamurthy et al, above), including: GE Healthcare; CTI Inc; Ion Beam Applications S.A. (Chemin du Cyclotron 3, B-1348 Louvain-La-Neuve, Belgium); Raytest (Germany) and Bioscan (USA) and are designed to be employed in a suitably configured radioactive work cell, or "hot cell", which provides suitable radiation shielding to protect the operator from potential radiation dose, as well as ventilation to remove chemical and/or radioactive vapours. Using a cartridge or cassette comprising reagents for the synthesis, the automated synthesis apparatus has the flexibility to make a variety of different radiolabelled compounds with minimal risk of cross-contamination, by simply changing the cartridge or cassette. This approach also has the advantages of simplified set-up hence reduced risk of operator error, improved GMP (good manufacturing practice) compliance, multi-tracer capability, rapid change between production runs, pre-run automated diagnostic checking of the cartridge or cassette and reagents, automated barcode cross-check of chemical reagents vs the synthesis to be carried out, reagent traceability, single-use and hence no risk of cross-contamination, tamper and abuse resistance.

Cassettes are commercially available for use in the production of radiolabelled compounds on the FASTlab. A non-limiting example is the cassette for the production of [$^{18}$F]-FDG, wherein the NaOH already present in the cassette can be used as a conditioning liquid passed through the tC18 prior to its use for solid-phase deprotection. This is an exemplary way of carrying out aspects of the present invention (see FIG. 1). Other commercially-available cassettes for use with automated radiosynthesisers that include reversed phase SPE cartridges and suitable solvents can similarly be used to carry out the method of the present invention and attain the associated advantages in a straightforward manner. The conditioned reversed phase SPE cartridge provides benefits whatever the ultimate use may be. Examples of such uses include solid phase deprotection and purification. Therefore another aspect of the present invention is a method to deprotect a protected radiolabelled intermediate wherein said method comprises trapping said protected radiolabelled intermediate onto a conditioned reversed phase SPE cartridge as defined herein and then passing a deprotecting reagent through said SPE cartridge to obtain a deprotected radiolabelled compound. And a further aspect of the present invention is a method to purify a reaction mixture comprising a radiolabelled compound wherein said method comprises passing said reaction mixture through a conditioned reversed phase SPE cartridge as defined herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties, as if they were individually incorporated.

BRIEF DESCRIPTION OF THE EXAMPLES

Example 1 describes the synthesis of [$^{18}$F]-FDG on the FASTlab where conditioning of the environmental tC18 by a method of the invention is compared with that of the prior art.

Example 2 describes the synthesis of [$^{18}$F]-FDG on the FASTlab at high hot cell temperatures where conditioning of the environmental tC18 by a method of the invention is compared with that of the prior art.

Example 3 describes the key quality control parameters of the [$^{18}$F]-FDG obtained using a method of the present invention.

LIST OF ABBREVIATIONS USED IN THE EXAMPLES

| | |
|---|---|
| EOS | end of synthesis |
| [$^{18}$F]-FDG | [$^{18}$F]-fluorodeoxyglucose |
| QC | quality control |
| RCP | radiochemical purity |

EXAMPLES

Example 1: [$^{18}$F]-FDG Synthesis on the FASTlab with Prior Art and Inventive Methods for Conditioning Environmental tC18

The commercially-available FASTlab cassette for the production of [$^{18}$F]-FDG citrate was used to test the present invention.

The prior art method used for conditioning the tC18 environmental column was carried out as per the commercial method.

The inventive conditioning process consisted of passing a small amount of NaOH through the tC18 cartridge. Two tC18 cartridges are used in the FASTlab [$^{18}$F]-FDG citrate cassette, one tC18 Environmental (tall) for hydrolysis and one tC18 Plus Short (short) for purification. Conditioning was only tested on the tC18 Environmental, but similar results are to be expected on the tC18 Plus short (used for [$^{18}$F]-FDG syntheses in the TRACERlab MX process for instance).

The commercial [$^{18}$F]-FDG citrate process, automatically carried out on the FASTlab, was modified in order to perform conditioning according to the present invention. The sequence developed added the following steps to the known synthesis method, right after the Alumina cartridge rinse with water:

- 0.5 mL of NaOH is withdrawn in the right hand syringe via the tC18 Environmental, conditioning the cartridge
- The cartridge is flushed with nitrogen for 15 seconds in order to remove as much residual NaOH as possible
- The NaOH vial is pressurized with nitrogen for 5 seconds, in order to ensure a proper transfer during the hydrolysis After those steps, EtOH and water conditioning were carried out on the cartridge and the known [$^{18}$F]-FDG process was continued.

A summary of Runs 1-14 for which results are provided in Table 1 are as follows:

Hot Runs Performed on FDG Citrate Batch 18463 with Sequence GE FDGc 22 mL-PETCS021FLr The sequence GE FDGc 22 mL-PETCS021FLr is the 22 mL software sequence that runs with the commercially-available FDG Citrate FASTlab cassette. Conditioning of the tC18 Environmental cartridge in this sequence involves passing through ~1 mL ethanol followed by ~3 mL of water.

Run 1 with the original tC18 cartridge (sorbent phase 0071)

Run 2 with the tC18 Environmental cartridge from sorbent batch 0082

Run 3 is a duplicate of Run 2 performed on the following day
- The yield is lower (16%) than usual (70-75%) for a FDG citrate performed with the tC18 Environmental cartridge made of sorbent 0082
- The TLC of the waste (i.e. lost product) reveals the presence of mainly FTAG, indicating that the low yield is due to poor retention of the product on the cartridge Hot Runs Performed on FDG Citrate Batch 21509 with Sequence GE_FDGc_22 mL-PETCS021FLr Run 4 with the tC18 Environmental cartridge from sorbent batch 0082

Run 5 with the same cartridge removed from the first cassette and used for another synthesis on a fresh cassette
- The first time a cartridge from a poor batch is used, the yield is low (23%) due to poor retention of FTAG on the cartridge (confirmed by waste TLC)
- When a cartridge is re-used after a first synthesis, the yield goes up (74%) to the range of the normal production Hot Run Performed on FDG Citrate Batch 21509 with Sequence GE FDGc 22 mL LTV PETCS021FLr-heavycond The sequence GE FDGc 22 mL LTV PETCS021FLr-heavycond is the same as for GE FDGc 22 mL-PETCS021FLr except that for the conditioning of the tC18 Environmental cartridge twice the amount of water, i.e. ~6 mL, is used.

Run 6 with the tC18 Environmental cartridge from sorbent batch 0082

This sequence conditions the tC18 cartridge with twice as much water as usual
- The yield is low (33%). Conditioning heavily with water only is not enough to have good yield.

Hot Runs Performed on FDG Citrate Batch 21509 with Sequence GE_FDGc_22 mL-Petcs021FLR Run 7 with the tC18 Environmental cartridge from sorbent batch 0082

For this sequence we manually conditioned the tC18 with 0.9 mL of NaOH (2M) (mimicking the hydrolysis steps), then 2.5 mL of water to rinse it, then 0.9 mL of NaOH (2M), then 3 mL of water to rinse it again
- The yield is correct (62%) and the TLC shows mainly [18F]-F- in the waste. NaOH conditioning of the cartridge allows for good retention, even though the poor sorbent phase is used Hot Runs Performed on FDG Citrate Batch 25933

Runs 8-10 were carried out with the tC18 Environmental cartridge from sorbent batch 0082 and sequence GE_FDGc_22 mL-PETCS021FLr Run 11 with the tC18 Environmental cartridge from sorbent batch 0082 and sequence GE_FDGc_22 mL_NaOH conditioning 01 which is an automated sequence with NaOH conditioning of the tC18.
- The automated NaOH conditioning of tC18 environmental is possible and brings the lower retention capacity (low yield—37%—with the normal sequence) to normal levels (high yield—73%—with the NaOH sequence).

Hot Runs Performed on FDG Citrate Batch 26819 with Sequence GE_FDGc_22 mL_x_NaOH_P_S0.5 mL Runs 13-14 were carried out with the tC18 Environmental cartridge from sorbent batch 0082

The sequence GE FDGc 22 mL×NaOH P S0.5 mL is the same as for GE FDGc 22 mL-PETCS021FLr except the tC18 Environmental conditioning step (which is automated for this run) included the following sequential steps: ~0.7 mL NaOH, 15 seconds of nitrogen, ~1.0 mL EtOH and ~3 mL water.

TABLE 1 results obtained in Example 1

| Run ID | Sequence | tC18 sorbent batch | EOS yield (uncorrected for decay) | NaOH conditioning | Comment |
|---|---|---|---|---|---|
| 1 | GE_FDGc_22mL-PETCS021FLr[1] | 0071 | 73% | No | Run within normal condition |
| 2 | GE_FDGc_22mL-PETCS021FLr | 0082 | 16% | No | NA |
| 3 | GE_FDGc_22mL-PETCS021FLr | 0082 | 48% | No | NA |
| 4 | GE_FDGc_29mL-PETCS022FL[2] | 0082 | 23% | No | NA |
| 5 | GE_FDGc_29mL-PETCS022FL | 0082* | 74% | Yes | Same cartridge as run 5. Has been conditioned during the previous run |
| 6 | GE_FDGc_22mL_LTV_PETCS021FLr_heavycond | 0082 | 33% | No | Sequence with more water used for cond. |
| 7 | GE_FDGc_29mL-PETCS022FL | 0082 | 62% | Yes | Manual NaOH cond. |
| 8 | GE_FDGc_22mL-PETCS021FLr | 0082 | 13% | No | NA |
| 9 | GE_FDGc_22mL-PETCS021FLr | 0082 | 37% | No | NA |
| 10 | GE_FDGc_22mL-PETCS021FLr | 0082 | 8% | No | NA |
| 11 | GE_FDGc_22mL_NaOH cond 01 | 0082 | 73% | Yes | First automated NaOH sequence |
| 12 | GE_FDGc_22mL_NaOH cond 01 | 0082 | 73% | Yes | NA |
| 13 | GE_FDGc_22mL_X_NaOH_P_S0.5mL | 0082 | 75% | Yes | Optimised NaOH sequence |
| 14 | GE_FDGc_22mL_X_NaOH_P_S0.5mL | 0082 | 77% | Yes | Optimised NaOH sequence |

[1]Validated GE sequence producing 22 mL of final volume
[2]Validated GE sequence producing 29 mL of final volume Example 2: High Temperature [$^{18}$F]-FDG Synthesis on the FASTlab with Prior Art and Inventive Methods for Conditioning Environmental tC18

The prior art and inventive methods for conditioning the environmental tC18 cartridge were also tested where the temperature in the hot cell was 35° C.
Hot Runs Performed on FDG Citrate Batch 27358 at High Temperature (33.5-35° C.) with Sequence GE_FDGc_22 mL-PETCS021FLr Runs 15-16 represent runs performed for comparative purposes where the temperature of the hot cell was not increased. The sequence used for these runs was the 36 mL sequence available with the FDG Citrate FASTlab cassette (GE_FDGc_36 mL-PETCS021FLr). Conditioning is the same as the GE_FDGc_22 mL-PETCS021FLR sequence. The main difference is the final volume and the adjusted quantity of buffer used at the end of the sequence, which has no impact on the yield, merely on the formulation.

Runs 17-18 with the original tC18 cartridge (sorbent phase 0093) and sequence GE_FDGc_22 mL-PETCS021FLr Runs 19-20 with the original tC18 cartridge (sorbent phase 0093) and sequence FDG_FDGc_22 ml_x_NaOH_P_S0.5 mL.

Observations:
  Trapping efficiency of tC18 Environmental that give good yield in normal conditions decreases at higher ambient temperature
  NaOH conditioning restores the trapping efficiency at least up to 35° C.

TABLE 2 results obtained in Example 2

| Run ID | Sequence | tC18 sorbent batch | EOS yield (uncorrected for decay) | NaOH conditioning | Comment |
|---|---|---|---|---|---|
| 15 | GE_FDGc_36mL-PETCS021FLr[1] | 0093 | 77% | No | Normal temp. (25° C.) |

TABLE 2-continued results obtained in Example 2

| Run ID | Sequence | tC18 sorbent batch | EOS yield (uncorrected for decay) | NaOH conditioning | Comment |
|---|---|---|---|---|---|
| 16 | GE_FDGc_36mL-PETCS021FLr | 0093 | 75% | No | Normal temp. (25° C.) |
| 17 | GE_FDGc_22mL-PETCS021FLr[2] | 0093 | 47% | No | High temperature (35° C.) |
| 18 | GE_FDGc_22mL-PETCS021FLr | 0093 | 42% | No | High temperature (35° C.) |
| 19 | GE_FDGc_22mL_X_NaOH_P_S0.5mL | 0093 | 78% | Yes | High temperature (35° C.) |
| 20 | GE_FDGc_22mL_X _P_S0.5mL | 0093 | 77% | Yes | High temperature (35° C.) |

[1]Validated GE sequence producing 36 mL of final volume
[2]Validated GE sequence producing 22 mL of final volume Example 3: Key Quality Control Parameters of the [$^{18}$F]-FDG Obtained with the Method of the Present Invention The following QC parameters were verified:
The radiochemical purity of the production. Given the fact that there has been a conditioning of the hydrolysis cartridge with NaOH, and that less NaOH is potentially available for the hydrolysis step, once has to ensure that there is no difference in the radiochemical purity at the end of the production.
The pH of the collected [$^{18}$F]-FDG. Additional NaOH passed on the tC18 means that the pH of the collected vial could potentially be higher if not rinsed properly, or lower if less NaOH is used during the hydrolysis step.

| Run ID | tC18 sorbent batch | EOS yield (uncorrected for decay) | RCP* | pH |
|---|---|---|---|---|
| 13 | 0082 | 75% | 100% | 5.5 |
| 14 | 0082 | 77% | 100% | 5.7 |
| 19 | 0093 | 78% | 100% | 5.3 |
| 20 | 0093 | 77% | 100% | 5.5 |

*RCP is indicated in portion of FDG in the radio TLC chromatogram. A value of 100% indicates that FDG is the only radioactive species in the sample.

The results obtained demonstrate that the product properties comply with the USP and European Pharmacopeia levels, and verify that the inventive conditioning process can be used without impact on the quality of the produced [$^{18}$F]-FDG.

The invention claimed is:

1. A method to condition a tC18 reversed phase solid phase extraction (SPE) cartridge in an automated synthesizer cassette prior to trapping $^{18}$F-FTAG on the SPE cartridge, wherein said method comprises the sequential steps of passing through said SPE cartridge:
   (i) an inorganic solvent, wherein said inorganic solvent comprises NaOH;
   (ii) a polar organic solvent, wherein the polar solvent comprises ethanol; and
   (iii) a low-strength solvent, wherein the low-strength solvent comprises aqueous ethanol;
   wherein steps (i)-(iii) occur at 35° C., the $^{18}$F-FTAG is trapped on the SPE cartridge at 35° C., and the uncorrected for decay end of synthesis (EOS) yield of $^{18}$F-FDG is at least 77%.

2. The method as defined in claim 1 wherein said conditioning further comprises the following step (iv) of passing a low-strength solvent through said SPE cartridge wherein said low-strength solvent is selected from water or a buffer.

3. The method as defined in claim 1 wherein between 0.2-2.0 mL of said inorganic solvent is passed through said SPE cartridge in said conditioning step.

4. The method as defined in claim 1 wherein said method further comprised purification of a reaction mixture through the SPE cartridge to obtain the $^{18}$F-FDG in a purified form.

5. The method as defined in claim 1, wherein the SPE cartridge is flushed with nitrogen before step (ii) to remove residual inorganic solvent.

* * * * *